(12) United States Patent  (10) Patent No.: US 8,832,251 B2
George  (45) Date of Patent: Sep. 9, 2014

(54) SYSTEM AND METHOD FOR ENABLING A PEER-TO-PEER (P2P) CONNECTION

(75) Inventor: Richard John George, Waterloo (CA)

(73) Assignee: BlackBerry Limited, Waterloo (CA)

( * ) Notice: Subject to any disclaimer, the term of this patent is extended or adjusted under 35 U.S.C. 154(b) by 279 days.

(21) Appl. No.: 13/344,775

(22) Filed: Jan. 6, 2012

(65) Prior Publication Data

US 2012/0179829 A1   Jul. 12, 2012

Related U.S. Application Data

(60) Provisional application No. 61/430,417, filed on Jan. 6, 2011.

(51) Int. Cl.
*G06F 15/173* (2006.01)
*H04L 29/06* (2006.01)
*H04L 29/12* (2006.01)

(52) U.S. Cl.
CPC ........ *H04L 65/1069* (2013.01); *H04L 65/1073* (2013.01); *H04L 61/2564* (2013.01); *H04L 61/2575* (2013.01)
USPC ............................. 709/223; 709/203; 709/217

(58) Field of Classification Search
CPC ...................... H04L 41/0668; H04L 29/12537
USPC ........................... 709/223, 224, 229, 203, 217
See application file for complete search history.

(56) References Cited

U.S. PATENT DOCUMENTS 7,466,810 B1   12/2008  Quon et al.
7,941,551 B2*   5/2011  Anantharaman et al. ..... 709/228
7,962,621 B2*   6/2011  Deason .......................... 709/226
8,055,771 B2*  11/2011  Shen et al. ..................... 709/225
8,312,619 B2*  11/2012  Chow et al. ..................... 29/729
8,355,395 B2*   1/2013  Jackson et al. ................ 370/352
2003/0112823 A1   6/2003  Collins et al.

(Continued)

FOREIGN PATENT DOCUMENTS

EP         1720282 B1      8/2010
WO    WO 2007/027478 A1    3/2007
WO    WO 2008/101329 A1    8/2008

OTHER PUBLICATIONS

Ford, B. et al.; "Peer-to-Peer Communication Across Network Address Translators"; Feb. 17, 2005; http://www.brynosaurus.com/pub/net/p2pnat/.

(Continued)

*Primary Examiner* — Lashonda Jacobs
(74) *Attorney, Agent, or Firm* — Brett J. Slaney; Blake, Cassels & Graydon LLP

(57) ABSTRACT

A system and method are provided that enable a registrar or other server or proxy device to be used to provide a path between a pair of endpoint devices for exchanging addressing information, in order to establish a direct P2P connection. Once that connection is established, the connection may be used for any P2P data communications, e.g. SIP establishment of a VoIP call, instant messaging, online gaming, file transfer, multimedia streaming, etc. In this way, each endpoint device possesses a list of candidate addresses to establish a direct P2P connection, which may then be used for any type of communication. By relying on a registrar or other server to enable the candidate lists to be exchanged, control can still be maintained if necessary, since the candidate lists can be modified, e.g. to enable a transparent interception, to impose or remove security restrictions, etc.

21 Claims, 15 Drawing Sheets

(56) References Cited

U.S. PATENT DOCUMENTS

| | | |
|---|---|---|
| 2003/0140142 A1 | 7/2003 | Marples et al. |
| 2004/0139228 A1 | 7/2004 | Takeda et al. |
| 2007/0076729 A1 | 4/2007 | Takeda |
| 2008/0126528 A1 | 5/2008 | Takeda et al. |
| 2009/0089438 A1 | 4/2009 | Agarwal et al. |
| 2009/0119265 A1* | 5/2009 | Chou et al. ......................... 707/3 |
| 2009/0216887 A1* | 8/2009 | Hertle et al. .................. 709/227 |
| 2009/0323559 A1 | 12/2009 | Chen et al. |
| 2010/0260174 A1* | 10/2010 | Preiss et al. ................... 370/389 |
| 2010/0293297 A1* | 11/2010 | Perumal et al. .............. 709/245 |
| 2011/0093600 A1* | 4/2011 | Lee et al. ...................... 709/228 |
| 2012/0072479 A1* | 3/2012 | Pasko et al. ................... 709/201 |
| 2012/0158974 A1* | 6/2012 | Perumal et al. ................ 709/227 |
| 2012/0203916 A1* | 8/2012 | Burns et al. ................... 709/227 |
| 2013/0185440 A1* | 7/2013 | Blau et al. ..................... 709/227 |

OTHER PUBLICATIONS

Rosenbert, J. et al.; "Session Traversal Utilitiets for NAT (STUN)"; Networking Group; RFC 5389; Oct. 2008.

Manea, A.; Search Report from corresponding European Application No. 12150397.3; search completed Apr. 24, 2012.

Ginese, S.; Search Report from corresponding PCT Application No. PCT/CA2012/000012 ; search completed May 10, 2012.

* cited by examiner

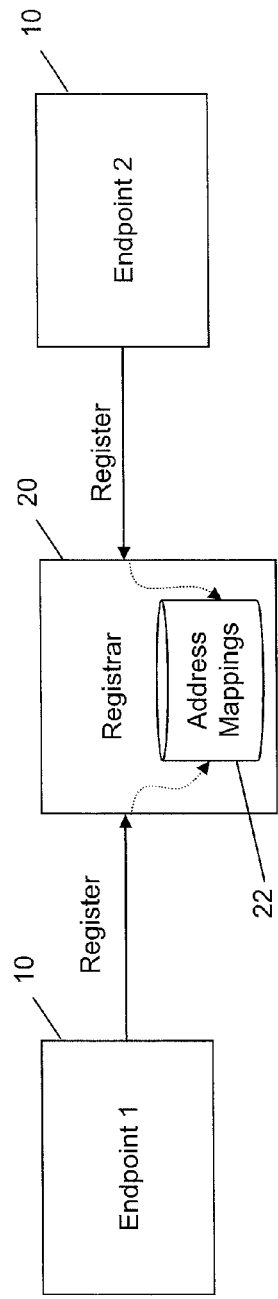
FIG. 4
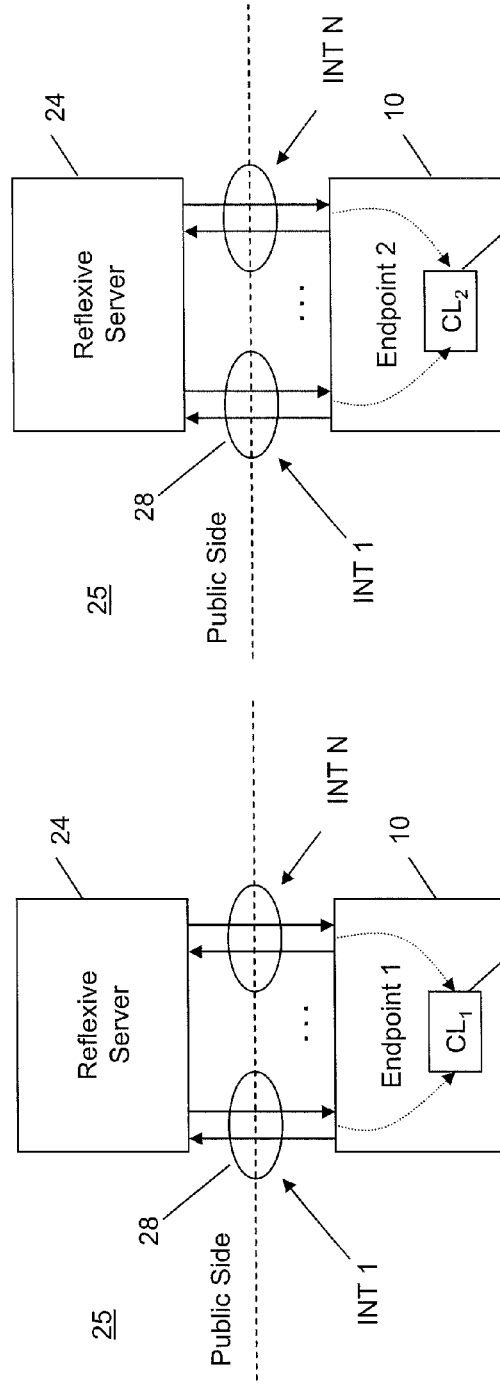
FIG. 6
FIG. 5

SYSTEM AND METHOD FOR ENABLING A PEER-TO-PEER (P2P) CONNECTION

This application claims priority from U.S. Provisional Patent Application No. 61/430,417 filed on Jan. 6, 2011, the contents of which are incorporated herein by reference.

TECHNICAL FIELD

The following relates generally to peer-to-peer (P2P) based communications and more particularly to enabling P2P connections.

BACKGROUND

Multimedia communication sessions such as voice and video calls over Internet Protocol (IP) may use defined signaling protocols such as the Session Initiation Protocol (SIP). Such a protocol can be used to create, modify, and terminate two-party (i.e. unicast) or multi-party (i.e. multicast) sessions comprising one or more media streams. Other example uses of protocols such as SIP include, without limitation, video conferencing, streaming multimedia distribution, instant messaging, presence information, file transfer, and online gaming.

Traditional SIP-based solutions such as those implementing voice over IP (VoIP), are either server based, thus using a registrar to identify the users of the system and their states, and a proxy to connect users together; or peer-to-peer (P2P), wherein the central servers are removed and the individual nodes form a mesh network in which any node can be reached from any other node, usually within six hops.

BRIEF DESCRIPTION OF THE DRAWINGS

Embodiments will now be described by way of example only with reference to the appended drawings wherein:

FIG. 4 is a block diagram illustrating a pair of endpoints registering with a registrar.

FIG. 5 is a block diagram illustrating an endpoint obtaining internet protocol (IP) addresses by communicating with a reflexive server.

FIG. 6 is a block diagram illustrating another endpoint obtaining internet protocol (IP) addresses by communicating with a reflexive server.

DETAILED DESCRIPTION OF THE DRAWINGS

Figure 1:
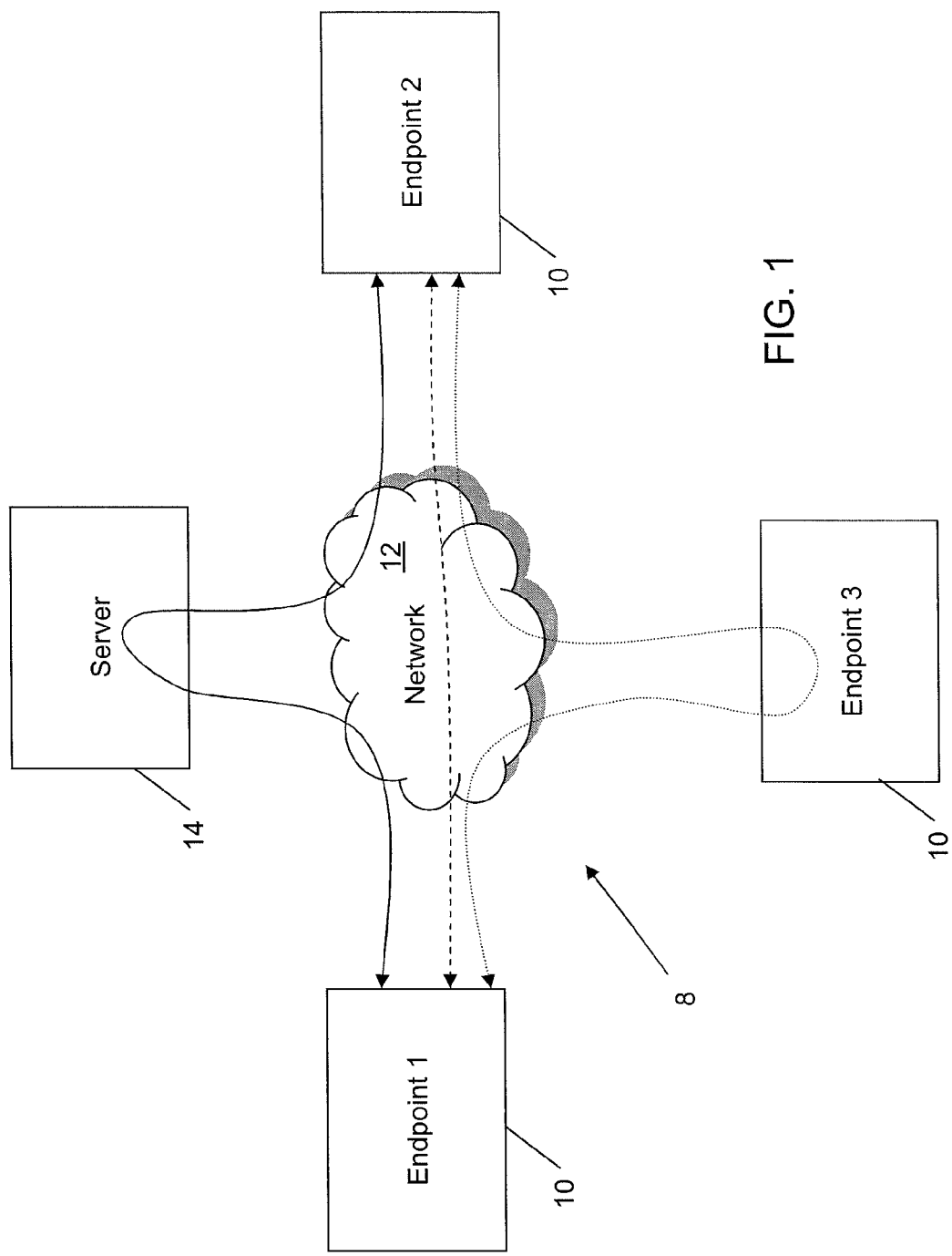
FIG. 1 is a block diagram of an example communication system illustrating multiple pathways between endpoints connectable to the communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

With the proxy/registrar-based solutions discussed above, the central server is involved in the call set up directly, and even if the call control is switched later to go peer-to-peer, if the peer-to-peer connection is to be used by some other solution, for example Real Time Streaming Protocol (RTSP), then the SIP session is adding unnecessary overhead. Moreover, by establishing a call through the proxy/registrar using an INVITE message, if another communication type such as a file transfer using a File Transfer Protocol (FTP) is requested, the call would need to be cancelled with the proxy/registrar.

With the P2P-based solutions, issues can be introduced due to the lack of a central server. For example, any connection needs to first be sought out, and in a mobile world where a device may gain and lose connectivity frequently, this can introduce excessive churn, thereby leading to lower performance at the device in terms of battery usage and latency in call establishment.

Network Address Translation (NAT) traversal issues, that is, the hiding of subnets behind a gateway, typically means that to use SIP and other protocols such as Session Description Protocol (SDP), each endpoint needs to be aware of not just the internal IP address of the endpoint, but also the external representation of those IP addresses (i.e. where the endpoint can be reached publicly—the public side of a NAT), so that the endpoint can be addressed by a device in another subnet.

It has been recognized that a registrar or other server or proxy device can be used to provide a path between a pair of endpoint devices for exchanging addressing information, in order to establish a direct P2P connection, e.g. using a SIP MESSAGE. Once that connection is established, the connection may be used for any P2P data communications, e.g. SIP establishment of a VoIP call, instant messaging, online gaming, file transfer, multimedia streaming, etc., without requiring an additional INVITE through the registrar, server, or proxy device. In this way, each endpoint device possesses a list of candidate addresses to establish a direct P2P connection, which may then be used for any type of communication. By relying on a registrar or other server to enable the candidate lists to be exchanged, control can still be maintained if necessary, since the candidate lists can be modified, e.g. to enable a transparent interception, to impose or remove security restrictions, etc.

Turning now to the figures, FIG. 1 illustrates an example communication system 8, which enables a plurality of endpoint devices 10 (referred to as "endpoints 10" for brevity hereinafter) to communicate via a network 12. It can be appreciated that the endpoints 10 may represent or otherwise comprise any computing device having processing and data communication capabilities such as a mobile data communication device (e.g. smart phone, tablet computer, portable gaming device, etc.), a desktop computing device, embedded computer, etc. It can also be appreciated that the network 12 may represent or comprise a wireless network, a wired network, or a combination of wired and wireless portions and capabilities. As such, the example communication system shown in FIG. 1 is for illustrative purposes only.

Three communication paths are illustrated in FIG. 1. A first communication path depicted using a solid line illustrates a server-based communication path, wherein a first endpoint 10, namely Endpoint 1 communicates with a second endpoint 10, namely Endpoint 2, via a server 14. The server 14 may represent any device or entity that is connectable to the network 12 and is capable of establishing and maintaining a connection with Endpoint 1 and Endpoint 2 in this example and any other endpoint 10 that it serves. The server 14 may represent or act as a registrar, proxy, certification authority, router, relay, gateway, host system, or any other suitable device as will be shown by way of example below. For example, the server 14 can be a SIP-based registrar and proxy used to establish VoIP calls between Endpoint 1 and Endpoint 2.

A second communication path, depicted using a long-dashed line illustrates a direct or true P2P communication path, wherein Endpoint 1 possesses an address (e.g. IP address) that enables it to communicate directly with Endpoint 2 without relying on a server 14 or other device to forward or relay the communication. For example, this communication path may be implemented in a closed system or a system comprising a relatively small number of users, each maintaining current addresses for other users.

A third communication path shown in FIG. 1 using the short-dashed line illustrates another P2P communication path, which is more typical for larger systems with a greater number of users. In this example, a third endpoint 10, namely Endpoint 3 acts as a node which also serves as one of the network's proxies, handling data flow and connections for other users, commonly referred to as a supernode.

As discussed above, although the use of a server 14 can provide improved reliability since each endpoint 10 only needs to maintain a connection with the server 14 and can rely on the server 14 to maintain a connection with other endpoints 10, the server 14 adds additional overhead, which can be costly.

Figure 2:
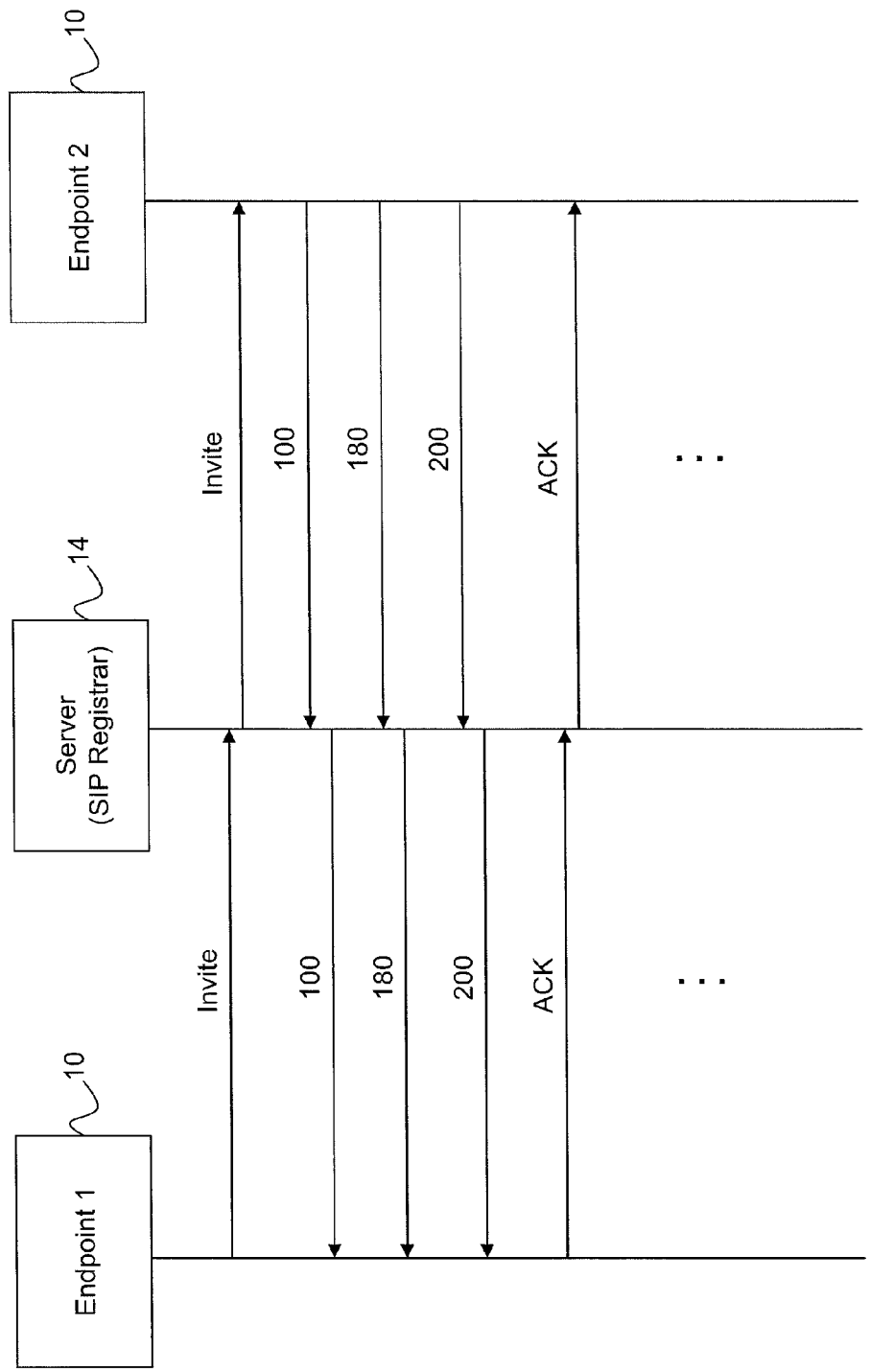
FIG. 2 is a flow diagram illustrating establishment of a dialog using a Session Initiation Protocol (SIP).

Turning now to FIG. 2, an example is shown wherein a traditional SIP registrar acts as a server 14 between Endpoint 1 and Endpoint 2 for establishing a dialog for a VoIP call. It can be seen from the example in FIG. 2 that each message sent is relayed or forwarded by the server 14 to the other endpoint 10 and thus the server is required for the entire session. For example, an INVITE message sent by Endpoint 1 according to the SIP is forwarded to Endpoint 2 using an already established connection between the server 14 and Endpoint 2. Any response, such as a "trying" response 100 is also forwarded, this time from the server 14 back to Endpoint 1.

Figure 3:
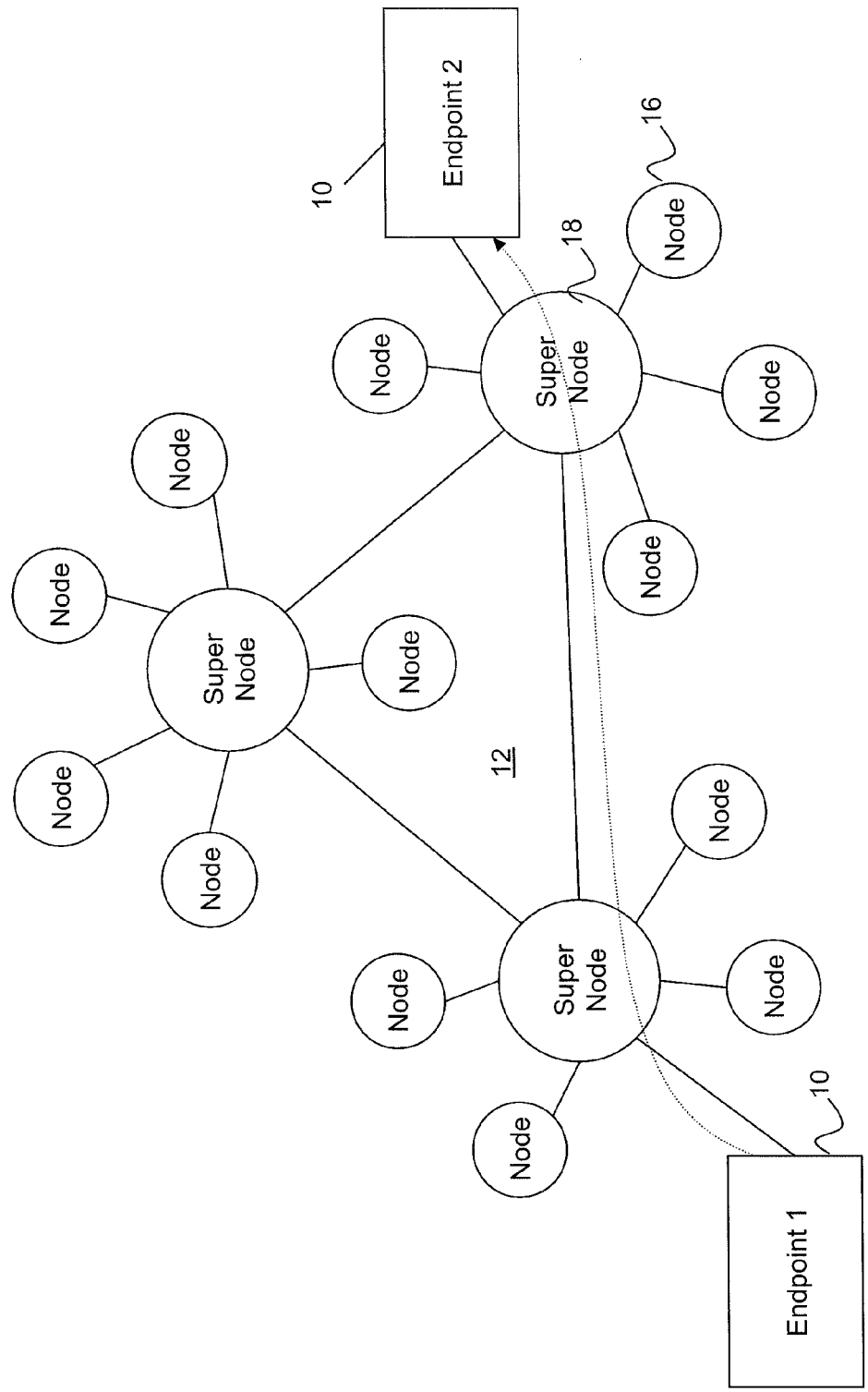
FIG. 3 is a block diagram illustrating an example peer-to-peer (P2P) network comprising a pair of endpoints wherein the network is traversed using super nodes.

To avoid the need for a dedicated server, as shown in FIG. 3, a network 12 of nodes 16 and supernodes 18 can be relied upon to establish a connection between Endpoint 1 and Endpoint 2. In this example, Endpoint 1 has an address for a supernode 18 in the network 12, which supernode 18 has an address for the supernode 18 in the network 12 that is connectable to Endpoint 2. In this way, via a series of "hops", Endpoint 1 and Endpoint 2 can be connected. As noted above, when at least some of the nodes 16 and supernodes 18 being relied on are mobile devices that may go in and out of coverage, reliability of a connection can pose problems and results in longer query times, false positives in locating users who may have dropped out of wireless coverage and instability in the session between Endpoint 1 and Endpoint 2 In addition, the amount of transactions that are associated with a peer-to-peer network of this type tend to be high, leading to rapid battery drain and excessive bandwidth requirements on the wireless interface.

Turning now to FIG. 4, in order to address the potential issues posed by the solutions shown in FIGS. 2 and 3, a registrar 20, such as one that is normally used for SIP exchanges, can be used to exchange address information, by relying on the persistent connection between the endpoints 10 and the registrar 20. The exchange of address information, e.g. using a SIP MESSAGE, allows a direct P2P connection to be established between endpoints 10 and the connection used to perform any P2P-based communication. The registrar 20 may then be removed from the dialog, thus creating a direct P2P link while maintaining control of the initial registration and exchange. Moreover, by using an initial message to exchange address information rather than trying to establish a call through the registrar 20, e.g. using a SIP INVITE message, other types of data communications (e.g. file transfer) can be accomplished without having to cancel a call made through the registrar 20. Such control also enables the registrar 20 to modify parameters of the session in order to perform actions such as transparent interception, security enablement/disablement, communication recording, etc. It can be appreciated that the registrar 20 shown in FIG. 4 may be any server-type entity or device that performs a registration and enables the exchange of address information as will be explained below, and does not necessarily represent a SIP registrar and proxy.

As shown in FIG. 4, each endpoint 10 sends a registration request, command or other message, e.g. a SIP REGISTER message, to the registrar 20 to enable the registrar 20 to store address information for each endpoint 10 in an address mappings database 22. This allows a persistent connection to be maintained between the endpoint 10 and the registrar 20 for at least a particular amount of time (e.g. a session). For example, when entering an area where a particular service is valid, an endpoint 10 can send a REGISTER message to the registrar 20 at a public IP address indicating its availability. Alternatively, in some SIP-based embodiments, the endpoint may use a SUBSCRIBE message to subscribe to services. In either case, the registrar 20 is now aware of the availability of the endpoint 10. The endpoint 10 maintains a two way connection to the registrar 20, and this may be achieved with a Transmission Control Protocol (TCP) connection or User Datagram Protocol (UDP) connection, in an example embodiment. For a UDP connection, the endpoint 10 maintains UDP port connectivity through regular pings to the registrar 20, usually 120 seconds apart. In the case of a TCP connection, the endpoint 10 typically maintains a TCP timeout. In both cases, security may be provided either through Transport Layer Security (TLS), Datagram TLS (DTLS), or some form of proprietary encryption algorithm.

It has been found that in order to improve the likelihood of successfully traversing NAT gateways in the network 12, in order to open a direct P2P connection between endpoints 10, the endpoints 10 should have candidate address lists, to enable them to simultaneously send packets to each other using a hole punching technique to fool NATs and firewalls along the way into connecting the two endpoints 10. In order to have the candidate address list for another endpoint 10, an out-of-dialog transaction can be used to exchange such lists. For example, when registered with the registrar 20, a request and response exchange can be initiated wherein the requests and responses exchanged (e.g. using a SIP MESSAGE) contain the respective candidate lists. This enables the endpoints 10 having exchanged address lists, to immediately begin trying the addresses in the lists to establish a direct P2P connection.

FIGS. 5 and 6 illustrate example out-of-dialog transactions for Endpoint 1 and Endpoint 2 respectively. Endpoints 10 are often given private IP addresses and port numbers within a private network or sub-set of the wider Internet, which lies behind a gateway having a unique public IP address in the Internet. The gateways perform NAT to ensure communications returning to that endpoint 10 in a particular session are returned to the public IP address and then translated back to the private IP address. Due to the NAT, the endpoint 10 may know its private IP address (i.e. the one assigned by the gateway), but not the public IP address of the gateway, since the NAT hides this by re-translating an incoming packet. In order to discover the public IP address, a reflexive server 24 can be used. For example, a binding method using a Session Traversal Utilities for NAT (STUN) type reflexive server 24 can be used. This is accomplished by the endpoint 10 sending a Binding request message to a STUN server 24. As the Binding request message passes through a NAT, the NAT will modify the source transport address (i.e. the source IP address and source port) of the packet. As a result, the source transport address of the request received by the STUN server 24 will be the public IP address and port created by the NAT closes to the STUN server 24. This is called a reflexive transport address. The STUN server 24 then copies that source transport address (i.e. the reflexive address) into an XOR-MAPPED-ADDRESS attribute in a STUN Binding response and sends the response back to the endpoint 10 (i.e. the STUN client). As this packet passes back through a NAT, the NAT will modify the destination transport address in the IP header, but the transport address in the XOR-MAPPED-ADDRESS attribute within the body of the response should remain untouched. In this way, the endpoint 10 can learn its reflexive transport address allocated by the outermost NAT with respect to the STUN server 24 (e.g. multiple NATs may exist between endpoint 10 and server 24). It can be appreciated that any reflexive-type server 24 or any other device or entity which is operable to return a public IP address in a response to an endpoint 10 can be used and the STUN-based example is for illustrative purposes only.

As shown in FIGS. 5 and 6, for each interface 28 to the network 12 (e.g. including WiFi, virtual private network (VPN), etc.) the endpoint 10 can send a request to the reflexive server 24 which is at a known IP address in a public space 25 within the network 12. The reflexive server 24 prepares a response that includes the public IP address allocated by the outermost NAT with respect to the reflexive server 24, typically in the body of the response, which enables the endpoint 10 to build a candidate list (CL) 26. By querying the reflexive server 24 (or multiple reflexive servers 24 if necessary) over each interface to the network 12, the CL 26 can be made to include all IP addresses by which the endpoint 10 can be addressed. For example, if the endpoint 10 has a WiFi interface, it would have an IP address assigned to that interface either statically or via a program such as the Dynamic Host Configuration Protocol (DHCP), as well as a public IP address if that endpoint 10 is behind a NAT (i.e. how it is addressed outside of its sub-net). Each interface will typically have such a pair of addresses (i.e. private/public address pair), including "virtual" interfaces such as a VPN client.

Therefore, once the endpoints 10 are registered with the registrar 20 as shown in FIG. 4, at this time, or at any time thereafter, the endpoint 10 obtains a reflexive CL 26, that is, the list of IP addresses by which the device can be addressed either inside its local subnet or by a device external to the subnet, e.g. using STUN as discussed above.

As discussed above, if Endpoint 1 wishes to open a direct P2P connection to Endpoint 2, to be most successful at getting through the NAT, the respective CLs 26 (i.e. $CL_1$ and $CL_2$) should be exchanged and then the endpoints 10 simultaneously send packets to each other, e.g. using a Binding REQUEST format of STUN, fooling the NATs and firewalls into connecting the two devices.

In order to enable the endpoints 10 to have the respective other CLs 26, an out-of-dialog transaction (i.e. one that occurs separately from the intended dialog—e.g. VoIP call) is used by sending a message of a format compatible with the registrar 20, e.g. a SIP MESSAGE or OPTIONS packet, to be proxied or otherwise forwarded to the other endpoint 10. As there is an existing open connection between all registered devices and the registrar 20, the incoming CL exchange request is forwarded to the correct destination. By containing the respective CL 26 in the request (or response), each endpoint 10 in the eventual dialog has address information suitable to begin a hole punching process to establish a direct P2P connection.

Figure 7:
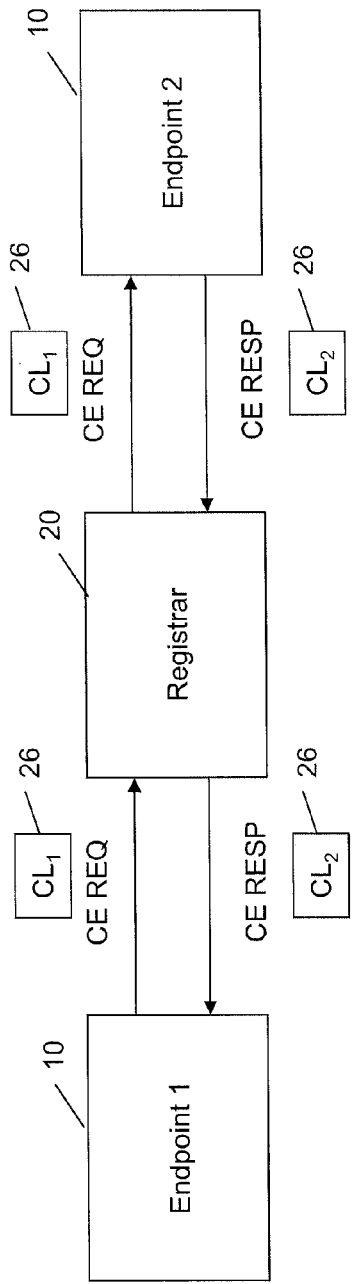
FIG. 7 is a block diagram illustrating an exchange of reflexive candidate address lists between a pair of endpoints.

FIG. 7 illustrates an example CL 26 exchange between Endpoint 1 and Endpoint 2. In this example, Endpoint 1 initiates the exchange by sending a candidate exchange (CE) request (REQ) containing its CL 26, i.e. $CL_1$ to the registrar 20. The registrar 20 being able to communicate directly with Endpoint 2 forwards the CE REQ containing $CL_1$ to Endpoint 2. Upon receiving the CE REQ, Endpoint 2 is operable to store $CL_1$ in order to begin trying the candidate addresses, and replies to the registrar 20 with a CE response (RESP) containing its CL 26, namely $CL_2$. The registrar 20 forwards the CE RESP containing $CL_2$ to Endpoint 1 to complete the exchange. Each endpoint 10 now has the other's CL 26.

It can be appreciated that the CE REQ and CE RESP exchange can be performed using any suitable protocol. For a SIP-based registrar 20 used to establish a voice connection, the CE REQ can be performed using an INVITE message containing $CL_1$ (e.g., see FIG. 2) with Endpoint 2 (i.e. the "callee") responding with a message 200 containing $CL_2$. The response message 200 may also include a random value to be used in the INVITE challenge later in the call setup INVITE (i.e. the P2P dialog to be created).

Figure 8:
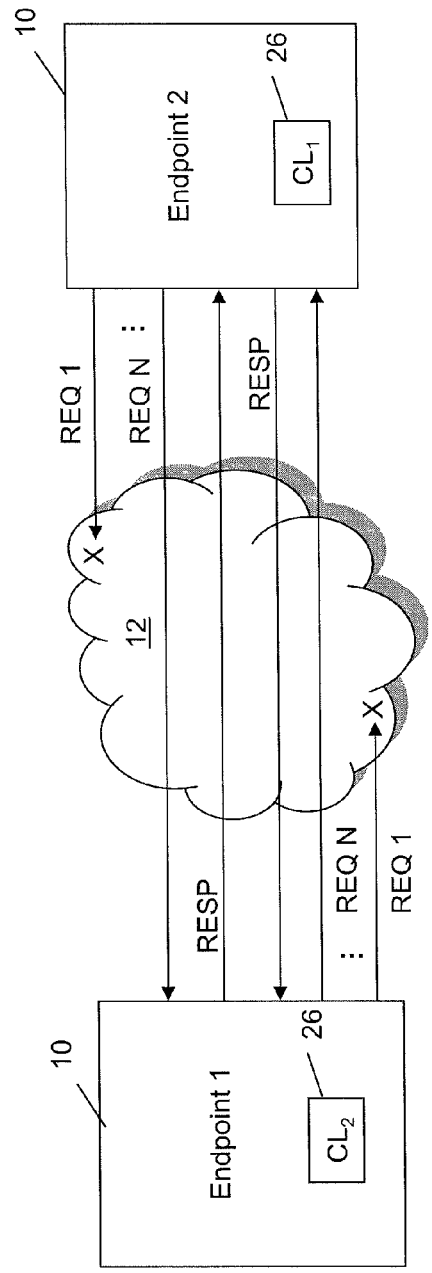
FIG. 8 is a block diagram illustrating a hole punching process for establishing a P2P connection between a pair of endpoints using candidate address lists previously exchanged.

Once the CLs 26 are exchanged, each CL entry is tried, by each endpoint 10, until a successful connection is achieved by each side, as shown in FIG. 8. The connection establishment shown in FIG. 8 can be performed using a hole punching technique, e.g., UDP or TCP hole punching. In such a technique, when Endpoint 1 sends a first request (REQ 1) to Endpoint 2, the address for Endpoint 2 is mapped by any intervening NAT, thus "punching a hole" in Endpoint 1's NAT. Once a packet is received by that NAT from Endpoint 2, it will be accepted as a solicited packet and be routed to Endpoint 1. A similar process occurs originating from Endpoint 2 such that once Endpoint 2's NAT has Endpoint 1's address mapped, it will accept inbound packets as being solicited. In order to ensure that a packet arrives after the hole has been punched, each REQ can be repeated a number of times (e.g., 4). This is done because the endpoints 10 may begin sending REQs immediately and simultaneously, so a REQ may reach the other endpoint's NAT before the source address has been mapped, causing the packet to be dropped. Some of the CL entries may correspond to private IP addresses that cannot be reached unless the endpoints 10 are in the same subnet. Therefore, each entry in the CL 26 is tried (multiple times if necessary) until a response (RESP) is received from the other endpoint 10. Receipt of a RESP at each side establishes a successful connection.

Once successful, a P2P connection between the two endpoints 10 exists and a dialog or other P2P session can begin. For example, in a SIP-based VoIP call, the caller (e.g. Endpoint 1) can send a standard SIP call flow to set up a call. It can be appreciated that if the registrar 20 has several devices registered for the same destination, the registrar's proxy can forward the MESSAGE to the different endpoints 10, forwarding the resultant responses 200 back to the caller as provisional responses 180 until the final forwarded response is received, which would result in a final response 200 to the caller. The caller may start forwarding the call establishments on receiving the first candidate list 180.

Figure 9:
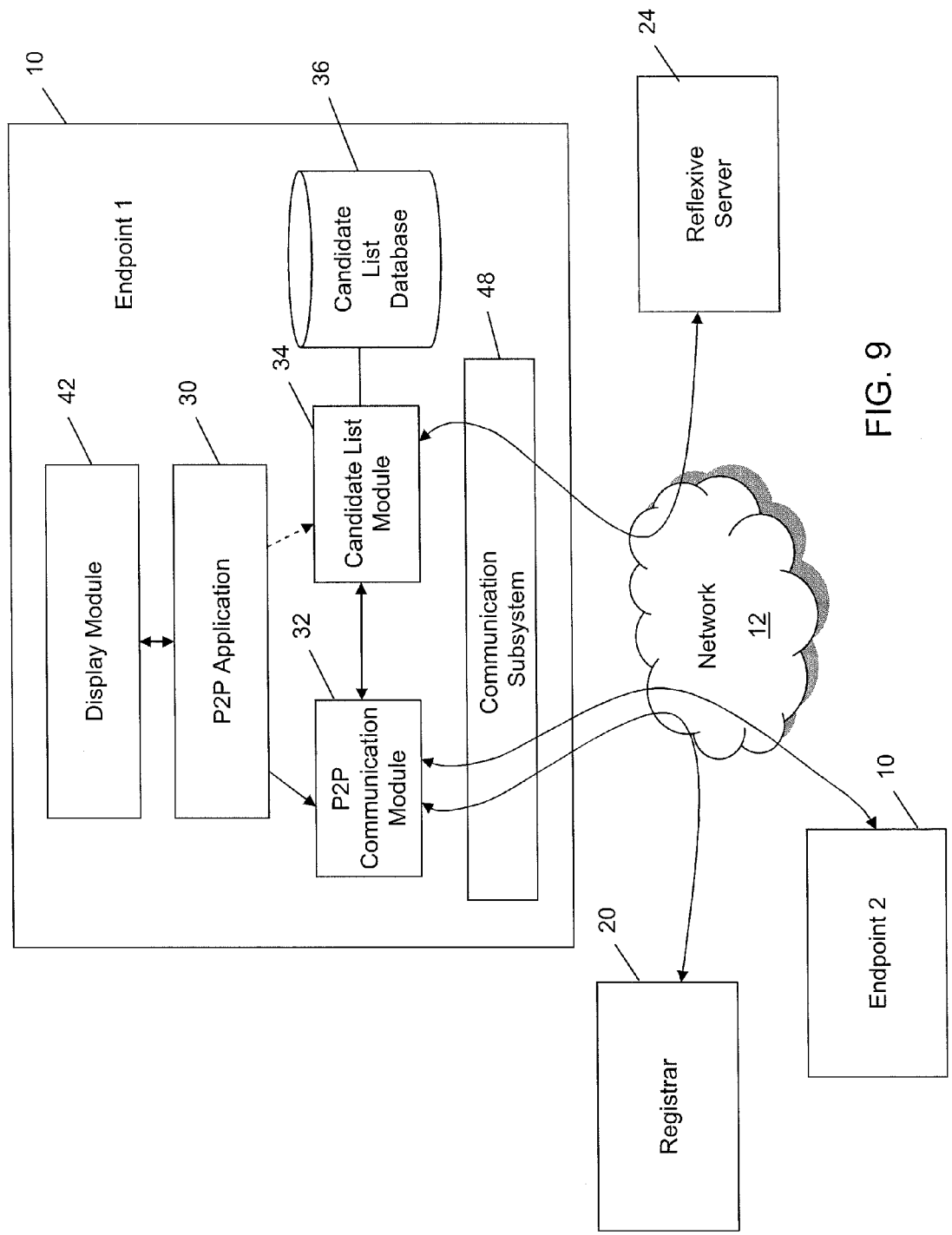
FIG. 9 is a block diagram of an example endpoint device.

FIG. 9 illustrates an example configuration for an endpoint 10. In this example, the endpoint 10 comprises a P2P application 30, e.g. VoIP application, IM application, gaming application, file transfer application/module, application enabling multimedia streaming, etc. The P2P application 30 may have a user interface (UI) aspect for interfacing with a user via a display module 42. The P2P application 30 comprises or communicates with (as shown) a P2P communication module 32, which is used to establish a P2P connection as described above. The endpoint 10 interfaces with the network 12 via a communication subsystem 48 for communicating with, for example, the registrar 20, and other endpoints 10 such as Endpoint 2. The P2P application 30 or P2P communication module 32 comprises or communicates with (as shown) a candidate list module 34, which enables the P2P application 30 or P2P communication module 32 to obtain a CL 26 from a candidate list database 36. The candidate list module 34 in this example communicates with the reflexive server 24 via the communication subsystem 48. It can be appreciated that the P2P application 30, P2P communication module 32, and candidate list module 34 are shown as separate modules or components for illustrative purposes only and in other embodiments they may be provided by a common module, e.g. as a component or module of the P2P application 30, etc.

Figure 10:
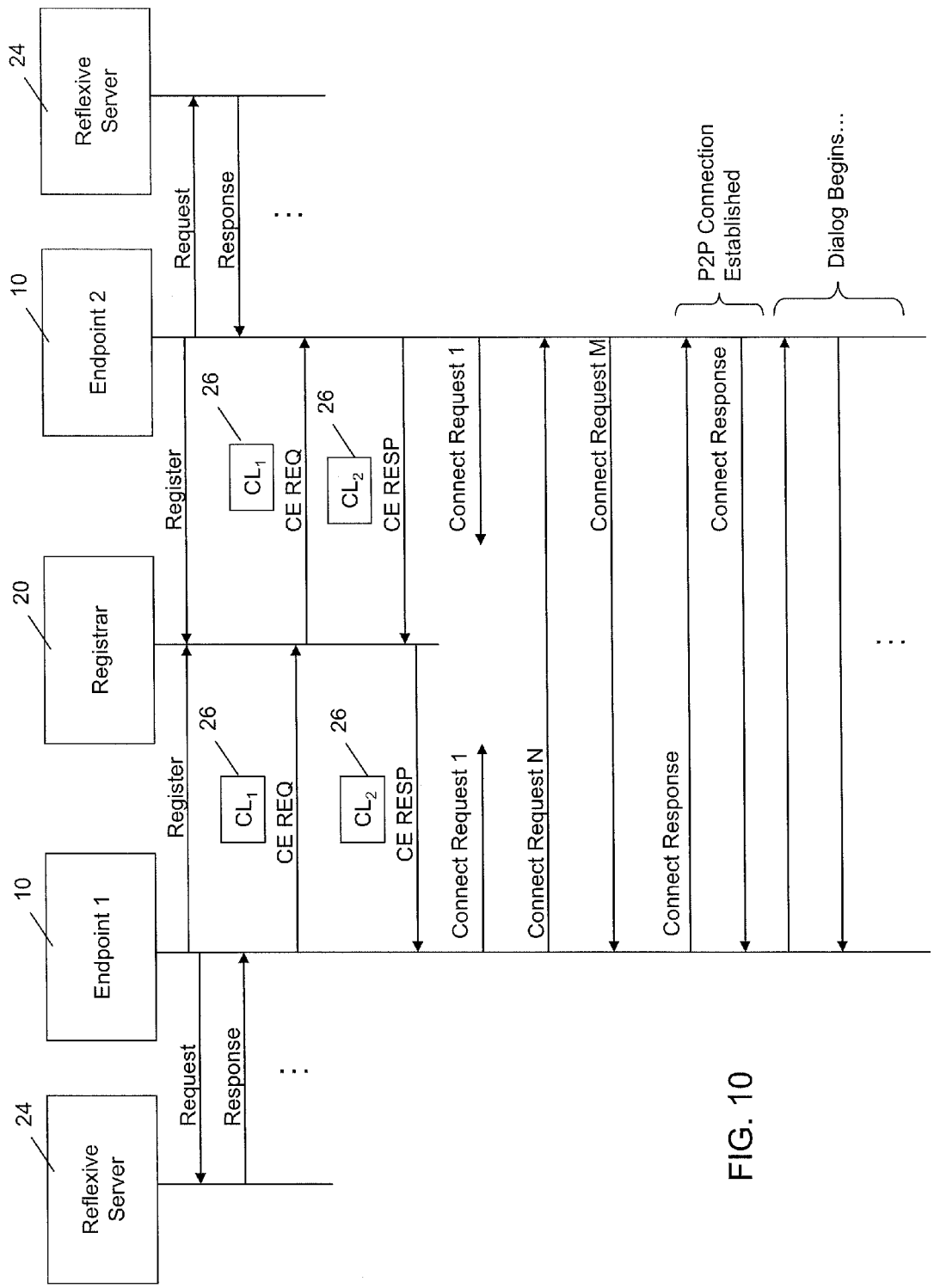
FIG. 10 is a flow diagram illustrating an example set of operations for establishing a P2P connection between a pair of endpoints.

FIG. 10 illustrates an example data flow for establishing a P2P connection. Each endpoint 10 both registers with the registrar 20 and obtains its CL 26 by request reflexive candidate addresses by sending requests to the reflexive server 24 and receiving responses therefrom. Once the CLs 26 are obtained, in this example, Endpoint 1 initiates a P2P connection by sending a CE REQ containing its CL 26, namely $CL_1$ as discussed above. Endpoint 2 responds to this request with $CL_2$ and the endpoints 10 begin to simultaneously attempt to connect to the other endpoint 10 by trying each address, typically multiple times. It can be seen that the registrar 20 is no longer needed as the endpoints 10 can use the CLs 26 to try CL entries. In this example, the Nth request is received by Endpoint 2 and the Mth request is received by Endpoint 1 via the hole punching technique. For example, the endpoints 10 may use STUN Binding requests and responses to establish this connection. Once the connection is made, a dialog may begin, e.g. a SIP-based VoIP call, etc.

Figure 11:
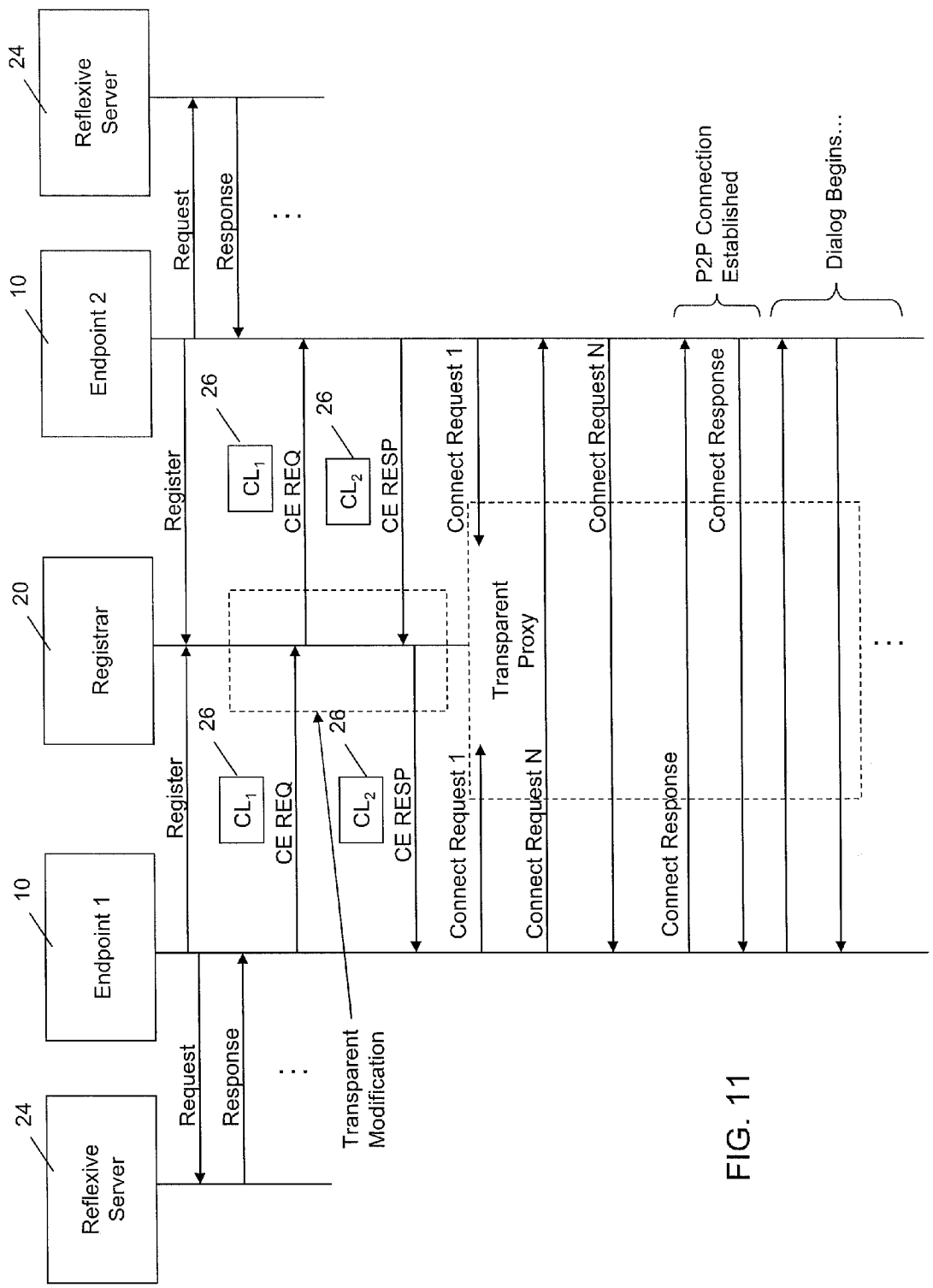
FIG. 11 is a flow diagram illustrating an example set of operations for establishing a P2P connection between a pair of endpoints and including transparent server interceptions.

Although the registrar 20 is not required once the CLs 26 have been swapped, since it is involved in the registration and CE process, there is an opportunity for the registrar 20 to exercise control over the eventual session. This is particularly advantageous for a registrar 20 that is controlled by an existing server or network component that wishes to intercept, copy, record, or modify parameters of the session. FIG. 11 illustrates one such example, wherein during the exchange of CLs 26, a transparent modification of one or more parameters is performed by the registrar 20. For example, the registrar 20 may introduce a transparent "hop" in the connection in order to intercept packets exchanged during the P2P session, e.g. to record communications (such as for wiretapping or other law-enforcement purposes), to remove security such as encryption or authentication, or to add better security. Once the transparent modification has been made, as shown in dashed lines in FIG. 11, the registrar 20 effectively imparts a transparent proxy so that it can continue to receive packets even though the endpoints 10 believe they have established a direct connection. This can be done by simply modifying the first address in the CL 26 to be a public IP address for the registrar 20 and have the registrar 20 return a connection response. If done on both sides, the registrar 20 will be the recipient of any communications and can choose to forward the packet (e.g. after performing some operation) or not according to a policy, set of rules, etc.

Figure 12:
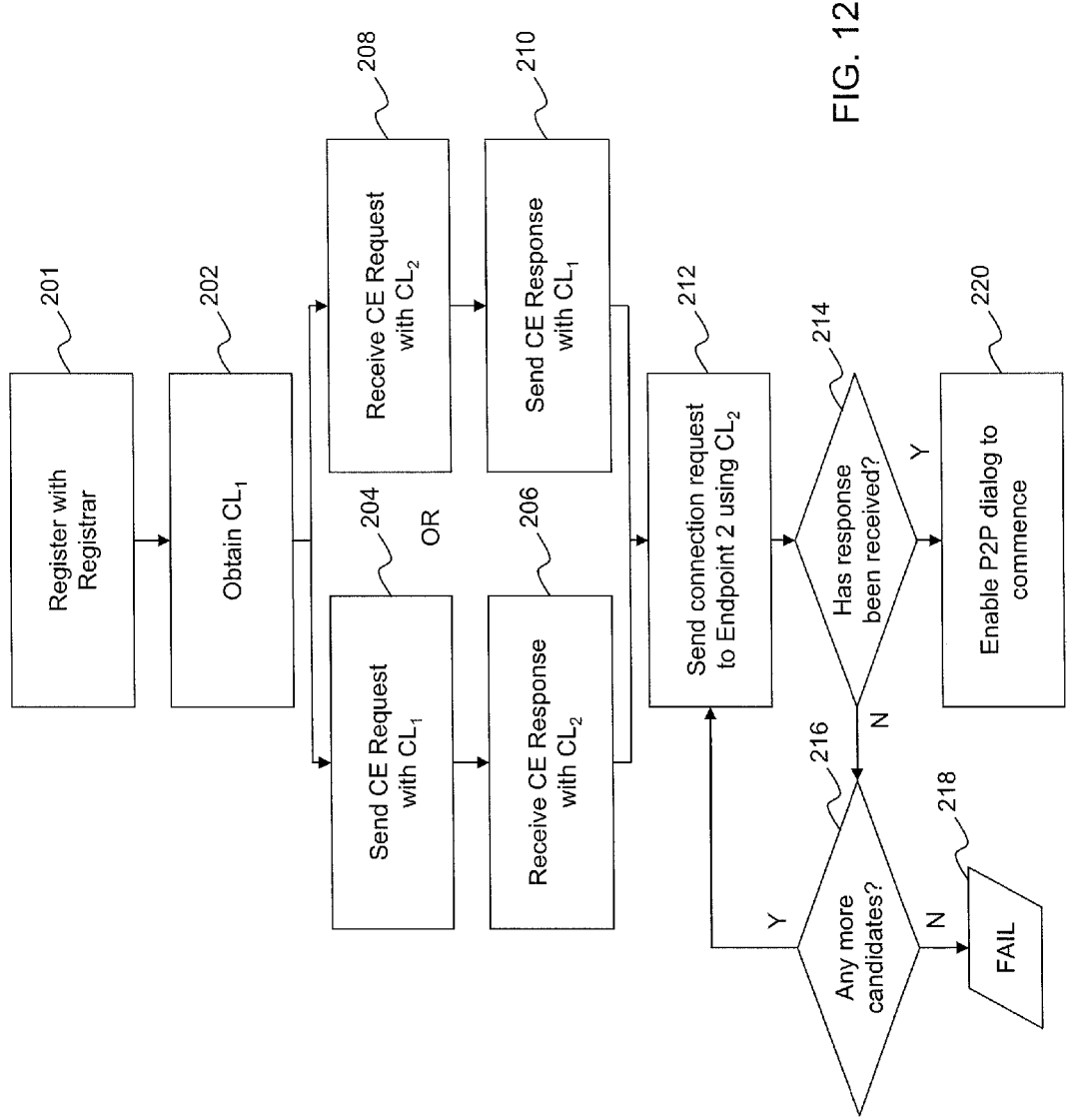
FIG. 12 is a flow diagram illustrating an example set of computer executable operations for one endpoint establishing a P2P connection with another endpoint.

FIG. 12 illustrates an example set of computer executable operations that may be performed by an endpoint 10 to establish a P2P connection. At 201, the endpoint 10 registers with the registrar 20, e.g. using the P2P connection module 32. At 202, the endpoint 10 obtains its CL 26, in this example $CL_1$, e.g. by communicating with the reflexive server 24 via the candidate list module 34. If Endpoint 1 initiates the exchange and thus the session, Endpoint 1 sends a CE REQ with $CL_1$ to Endpoint 2 at 204 and receives a CE RESP with $CL_2$ at 206. If Endpoint 2 initiates the exchange and session, Endpoint 1 receives a CE REQ with $CL_2$ at 208 and sends a CE RESP with $CL_1$ at 210. In either scenario, Endpoint 1 now has $CL_2$ and may begin sending connection requests to Endpoint 2 using an entry in $CL_2$ at 212. The endpoint 10 determines at 214 if a response has been received for the address used. If not, the endpoint 10 determines at 216 if any more candidates exist in $CL_2$. If not, the connection fails at 218. If there are more address candidates at 216, a new connection request is sent by repeating 212. If at 214 the endpoint 10 determines that a response has been received, a P2P dialog is enabled at 220.

Figure 13:
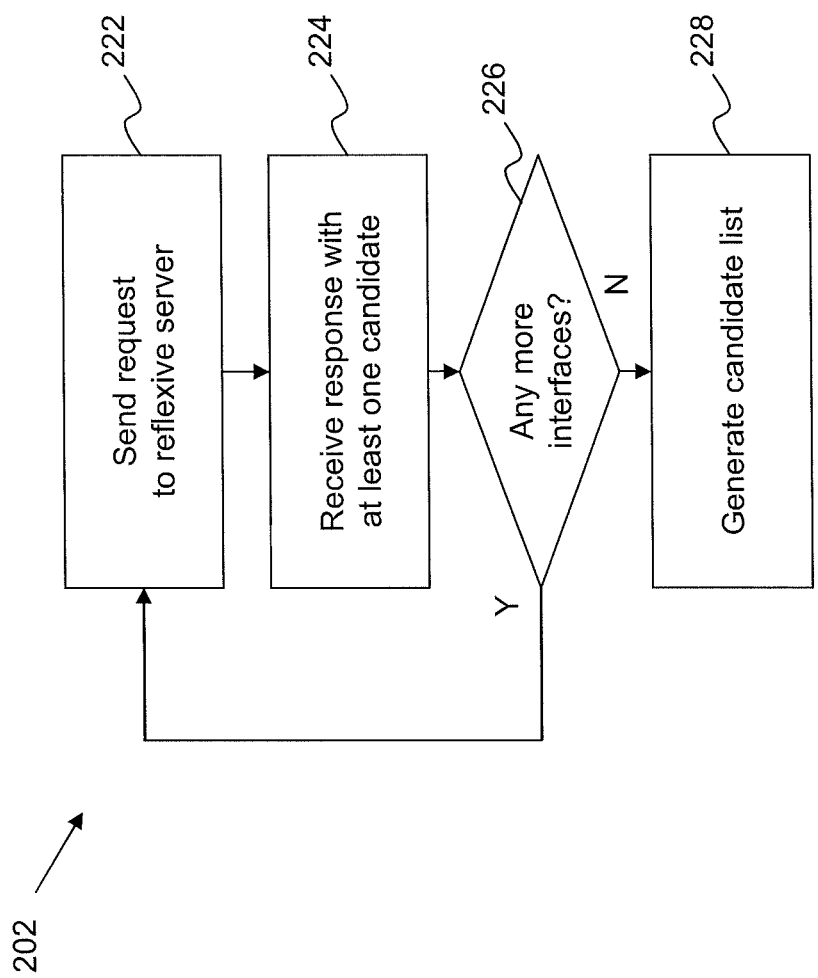
FIG. 13 is a flow diagram illustrating an example set of computer executable operations for generating a candidate list by communicating with a reflexive server.

As shown in FIG. 12, Endpoint 1 obtains $CL_1$ at 202. One example set of computer executable operations for obtaining a CL 26 is shown in FIG. 13. In FIG. 13, the endpoint 10 sends a request to the reflexive server 24 at 222 and receives a response with at least one candidate at 224. The endpoint 10 then determines if further interfaces exist at 226. If so, another response is sent and 222, 224, and 226 are repeated. If no more interfaces exist, the CL 26 is generated at 228.

Figure 14:
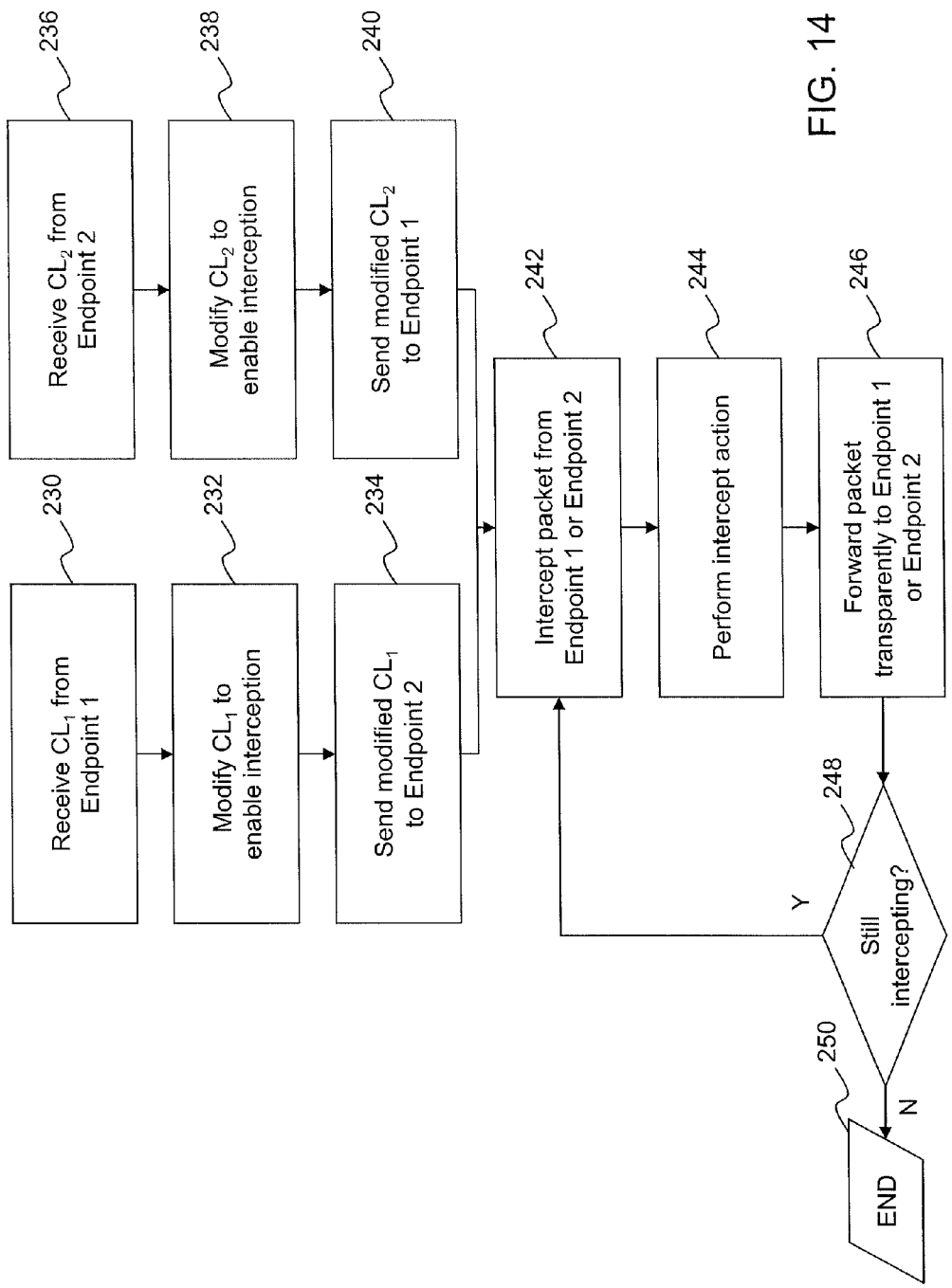
FIG. 14 is a flow diagram illustrating an example set of computer executable operations for a registrar enabling a candidate exchange list between a pair of endpoints and modifying such candidate lists to enable a transparent interception of subsequent communications between the endpoints.

FIG. 14 illustrates an example set of computer executable instructions that may be performed by the registrar 20 to establish a transparent interception for a P2P session between Endpoint 1 and Endpoint 2. At 230, $CL_1$ is received from Endpoint 1 (e.g., in the initial request or a response from Endpoint 1). $CL_1$ is modified to enable interception at 232, e.g., by changing a candidate list entry to a public IP address for or accessible to the registrar 20. The modified $CL_1$ is then sent to Endpoint 2 at 234. Similar operations with respect to $CL_2$ are performed at 236, 238, and 240. Since the CLs 26 have been modified, subsequent packets from Endpoint 1 and Endpoint 2 are intercepted at 242. An action is then performed at 244 upon interception. For example, the packet may simply be copied by the registrar 20 (i.e. recorded) and forwarded on to the destination transparently to the destination endpoint 10 and the originating endpoint 10 at 246.

The registrar 20 can establish the interception for an entire session or dialog or may be capable of disabling the interception, e.g. if only a portion thereof is of interest. If so, the registrar 20 determines at 248 if they should still be intercepting. If not, the transparent interception ends at 250. If the registrar 20 is to continue intercepting, the process repeats at 242.

Figure 15:
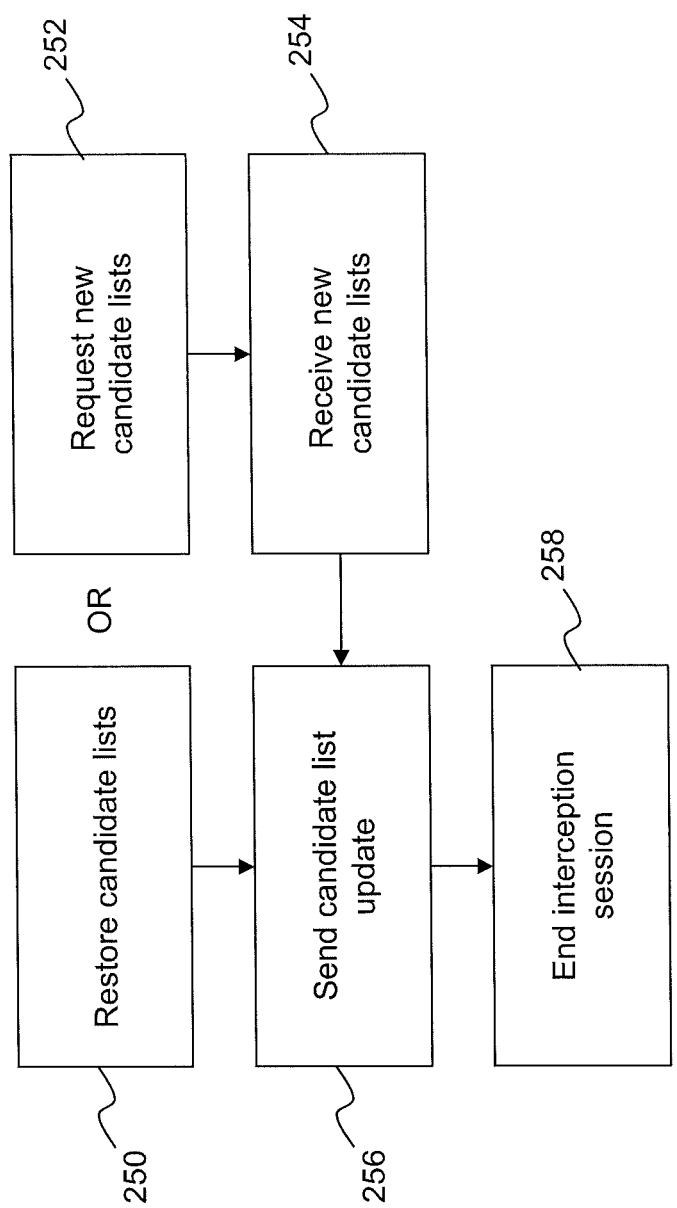
FIG. 15 is a flow diagram illustrating an example set of computer executable operations for ending transparent server interceptions.

FIG. 15 illustrates an example set of computer executable operations that may be performed by the registrar 20 in ending a transparent interception. At 250, the registrar 20 restores the CLs 26, e.g., by reinstating a copy of the original CLs 26 received from the endpoints 10, and sends CL updates to the endpoints 10 at 256. This can be masked as a network or system-level upgrade or other benign exchange to maintain the transparency of the registrar's involvement in the P2P session. Alternatively, the registrar 20 may request fresh CLs 26 by sending requests at 252 and receiving new CLs 26 at 254. The new CLs 26 are then sent to the endpoints 10 at 256. The interception session may then be ended at 258 such that the endpoints 10 continue to participate in the session or dialog without the registrar's involvement.

The above principles can be applied to various communication systems, wherein existing servers or components of a network infrastructure may be utilized to perform the operations of the registrar 20, reflexive server 24, or both.

Although the principles discussed below are applicable to any endpoint 10 comprising any electronic communication device, examples below will be provided for a mobile communication device, which is one of many types of electronic communication devices.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, computers, laptops, handheld or other wireless communication devices, wirelessly enabled notebook computers, portable gaming devices, tablet computers, or any other portable electronic device with processing and communication capabilities.

Figure 16:
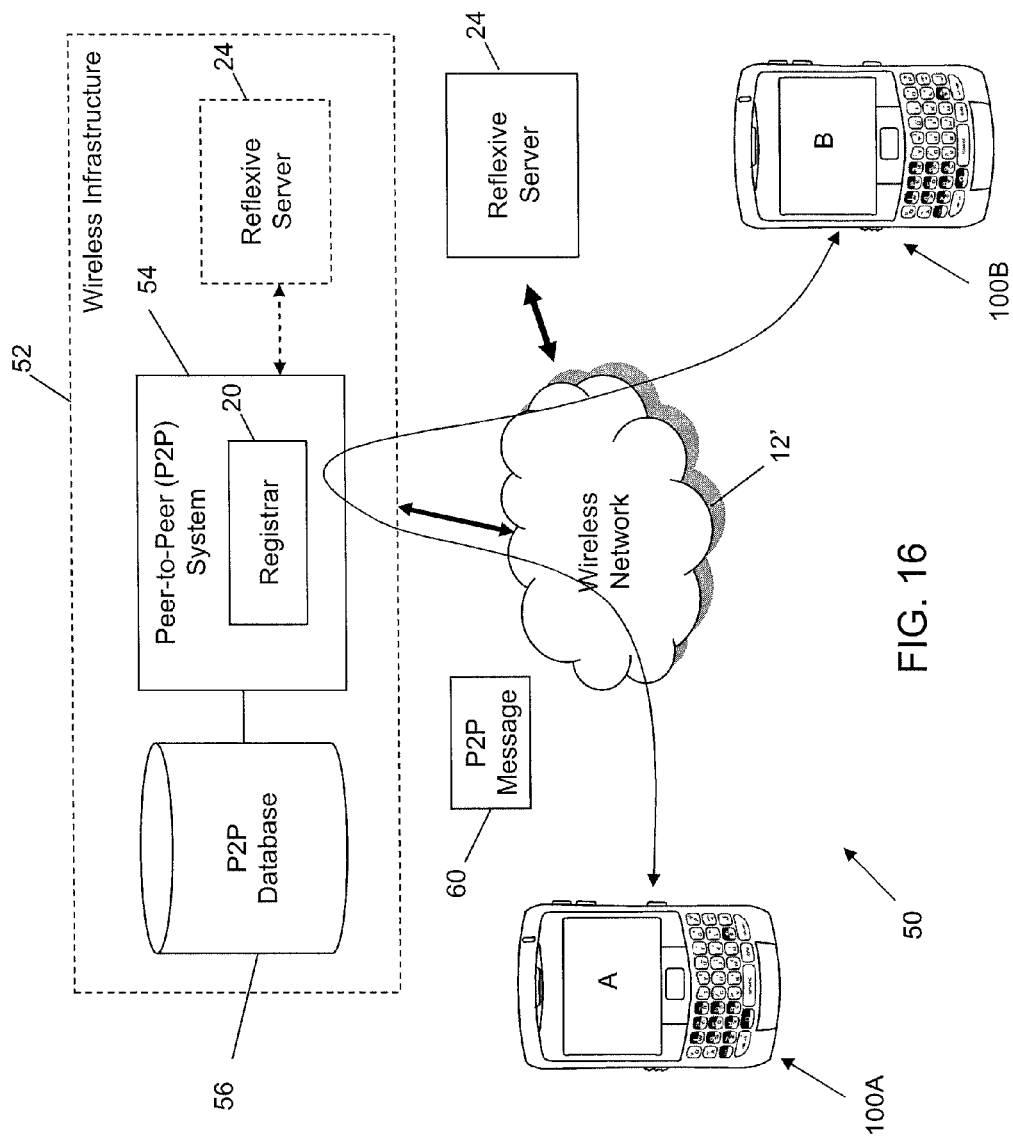
FIG. 16 is a block diagram of an example wireless communication system comprising a P2P system, the P2P system comprising a registrar.

Turning to FIG. 16, an example communication system 50 is shown. The communication system 50 in this example, at least in part, enables mobile devices, commonly referred to by numeral 100 (or using numeral 100 as a prefix—e.g., mobile device A, also denoted by 100A and mobile device B, also denoted by 100B), to communicate via a peer-to-peer (P2P) system 54 via a wireless network 12'. It will be appreciated that two mobile devices 100A, 100B shown in FIG. 16 are for illustrative purposes only and many other mobile devices 100 (not shown) may also be capable of communicating with or within the communication system 50. It will also be appreciated that although the examples shown herein are directed to mobile communication devices, the same principles may apply to other devices capable of communicating with the P2P system 54. For example, an application (not shown) hosted by a desktop computer or other "non-portable" or "non-mobile" device may also be capable of communicating with other devices (e.g. including mobile devices 100) using the P2P system 54.

The P2P system 54 is, in this example, a component of a wireless infrastructure 52 associated with the wireless network 12'. The wireless infrastructure 52 in this example comprises, in addition to the P2P system 54, and among other things not shown for simplicity, a P2P database 56. The P2P database 56 in this example is used to store one or more personal identification numbers (PINs) associated with particular mobile devices 100, whether they are subscribers to a service provided by the wireless infrastructure 52 or otherwise.

The mobile device 100A may communicate with the mobile device 100B and vice versa via the P2P system 54, in order to perform P2P messaging or to otherwise exchange P2P-based communications, as will be explained in greater detail below. For ease of explanation, in the following examples, any P2P-based communication may also be referred to as a P2P message 60 as shown in FIG. 16.

As can be seen in FIG. 16, the P2P system 54 in this example can host or otherwise provide the capabilities of the registrar 20 according to the principles discussed above. In this way, an existing component of the wireless infrastructure 52 can be used to enable the P2P communications in the way described above. In such an embodiment, a reflexive server 24 that is connectable to the wireless network 12' can be communicated with by the mobile devices 100A, 1006 in order to generate the CLs described above. The wireless infrastructure 52 may also or instead include or otherwise provide the reflexive server 24. In other embodiments (not shown), a single device or entity can provide both the registrar 20 and reflexive server 24, e.g., a component of the P2P system 54.

In another example, the mobile device 100 may be one that is used in a system that is configured for continuously routing all forms of pushed information from a host system 98 to the mobile device 100. One example of such a system will now be described making reference to FIG. 17.

Figure 17:
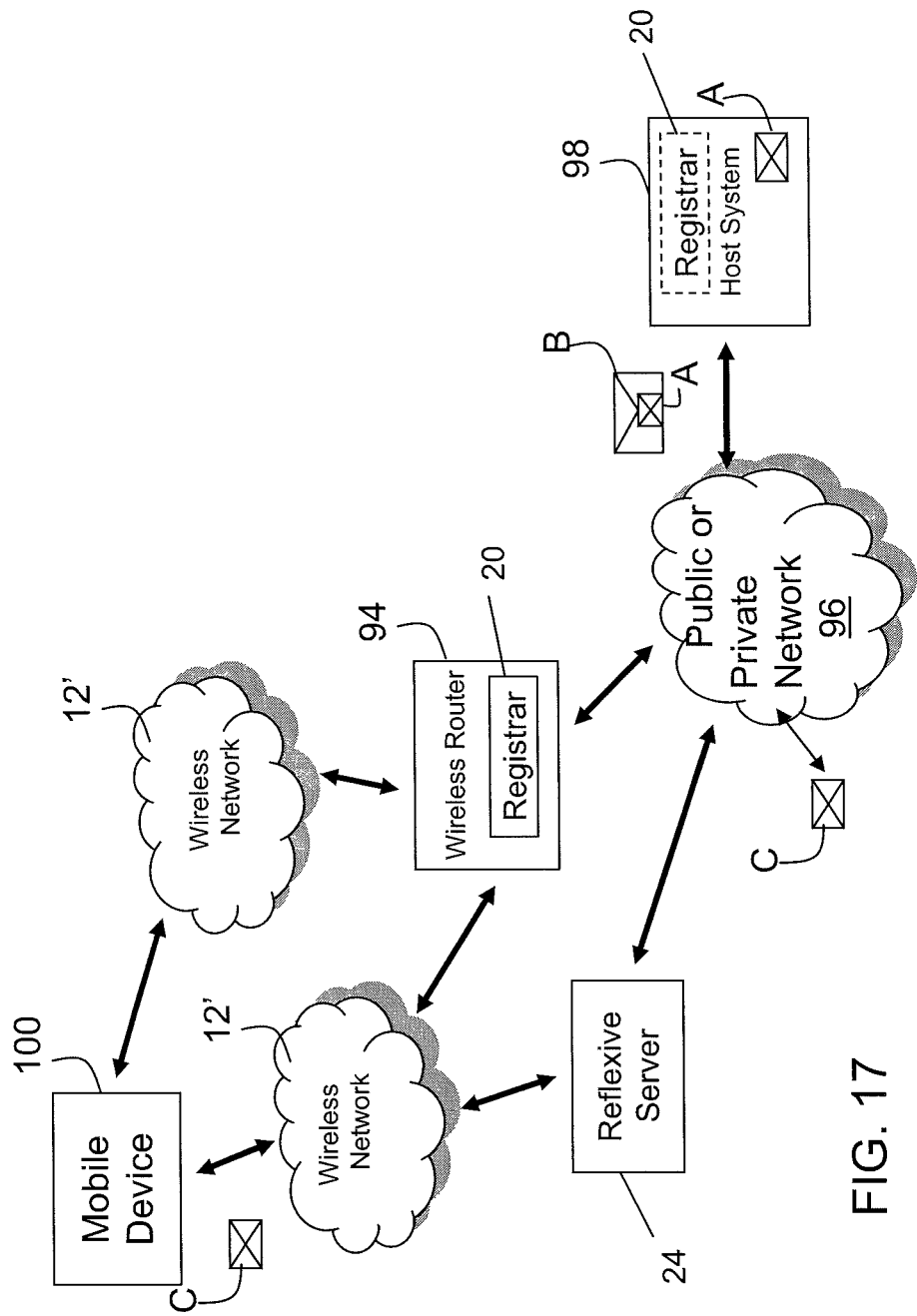
FIG. 17 is a system diagram illustrating an environment in which data items are pushed from a host system to a mobile device, a router in such environment or the host system comprising a registrar.

FIG. 17 is an example system diagram showing the redirection of user data items (such as message A or C) from a corporate enterprise computer system (host system) 98 to the user's mobile device 100 via a wireless router 94. The wireless router 94 provides the wireless connectivity functionality as it acts to both abstract most of the wireless network's 12 complexities, and it also implements features necessary to support pushing data to the mobile device 100. Although not shown, a plurality of mobile devices may access data from the host system 98. In this example, message A in FIG. 17 represents an internal message sent from, e.g. a desktop computer 84 within the host system 98, to any number of server computers in a corporate network (e.g. LAN), which may, in general, include a database server, a calendar server, an E-mail server, a voice-mail server, etc.

As can be seen in FIG. 17, the wireless router 94 can be configured to include or otherwise provide the registrar 20 or components or modules capable of providing similar services. The registrar could also be included in or be provided by the host system 98. A reflexive server 24 is also shown in FIG. 17 which can be communicated with via the wireless network 12' or a public or private network 96 or both. Therefore, it can be appreciated that the principles discussed above in connection with FIGS. 1 to 15 may be applied to any communication system comprising an entity capable of providing proxy or server like functionality.

Message C in FIG. 17 represents an external message from a sender that is not directly connected to the host system 98, such as the user's mobile device 100, some other user's mobile device (not shown), or any user connected to the public or private network 96 (e.g. the Internet). Message C could be e-mail, voice-mail, an instant message (IM), calendar information, database updates, web-page updates or could even represent a command message from the user's mobile device 100 to the host system 98. The host system 98 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 100 may be adapted for communication within wireless network 12' via wireless links, as required by each wireless network 12' being used. As an illustrative example of the operation for a wireless router 94 shown in FIG. 17, consider a data item A, repackaged in outer envelope B (the packaged data item A now referred to as "data item (A)") and sent to the mobile device 100 from an Application Service Provider (ASP) in the host system 98. Within the ASP is a computer program, similar to a wireless mobility agent, running on any computer in the ASP's environment that is sending requested data items from a data store to a mobile device 100. The mobile-destined data item (A) is routed through the network 96, and through the wireless router's firewall (not shown) protecting the wireless router 94.

Although the above describes the host system 98 as being used within a corporate enterprise network environment, this is just one embodiment of one type of host service that offers push-based messages for a handheld wireless device that is capable of notifying and preferably presenting the data to the user in real-time at the mobile device when data arrives at the host system 98.

By offering a wireless router 94 (sometimes referred to as a "relay"), there are a number of major advantages to both the host system 98 and the wireless network 12'. The host system 98 in general runs a host service that is considered to be any computer program that is running on one or more computer systems. The host service is said to be running on a host system 98, and one host system 98 can support any number of host services. A host service may or may not be aware of the fact that information is being channeled to mobile devices 100. For example an e-mail or message program might be receiving and processing e-mail while an associated program (e.g. an e-mail wireless mobility agent) is also monitoring the mailbox for the user and forwarding or pushing the same e-mail to a wireless device 100. A host service might also be modified to prepared and exchange information with mobile devices 100 via the wireless router 94, like customer relationship management software. In a third example, there might be a common access to a range of host services. For example a mobility agent might offer a Wireless Access Protocol (WAP) connection to several databases.

In data messaging environments, the wireless router 94 may abstract the mobile device 100 and wireless network 12', offer push services to standard web-based server systems and allow a host service in a host system 98 to reach the mobile device 100 in many countries.

The host system 98 shown herein has many methods when establishing a communication link to the wireless router 94. For one skilled in the art of data communications the host system 98 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 98 that might employ the wireless router 94 to perform push could include: field service applications, e-mail services, IM services, stock quote services, banking services, stock trading services, field sales applications, advertising messages and many others. This wireless network 12' abstraction is made possible by the wireless router 94, which implements this routing and push functionality. The type of user-selected data items being exchanged by the host could include: E-mail messages, instant messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 98, or that the host system 98 acquires through the use of intelligent agents, such as data that is received after the host system 98 initiates a search of a database or a website or a bulletin board.

The wireless router 94 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like Enhanced Data Rates for GSM Evolution (EDGE), Universal Mobile Telecommunications System (UMTS) and High-Speed Downlink Packet Access (HSDPA), Long Term Evolution (LTE), Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 98, the wireless router 94 may implement a set of defined functions. It can be appreciated that one could select many different hardware configurations for the wireless router 94, however, many of the same or similar set of features would likely be present in the different configurations.

Figure 18:
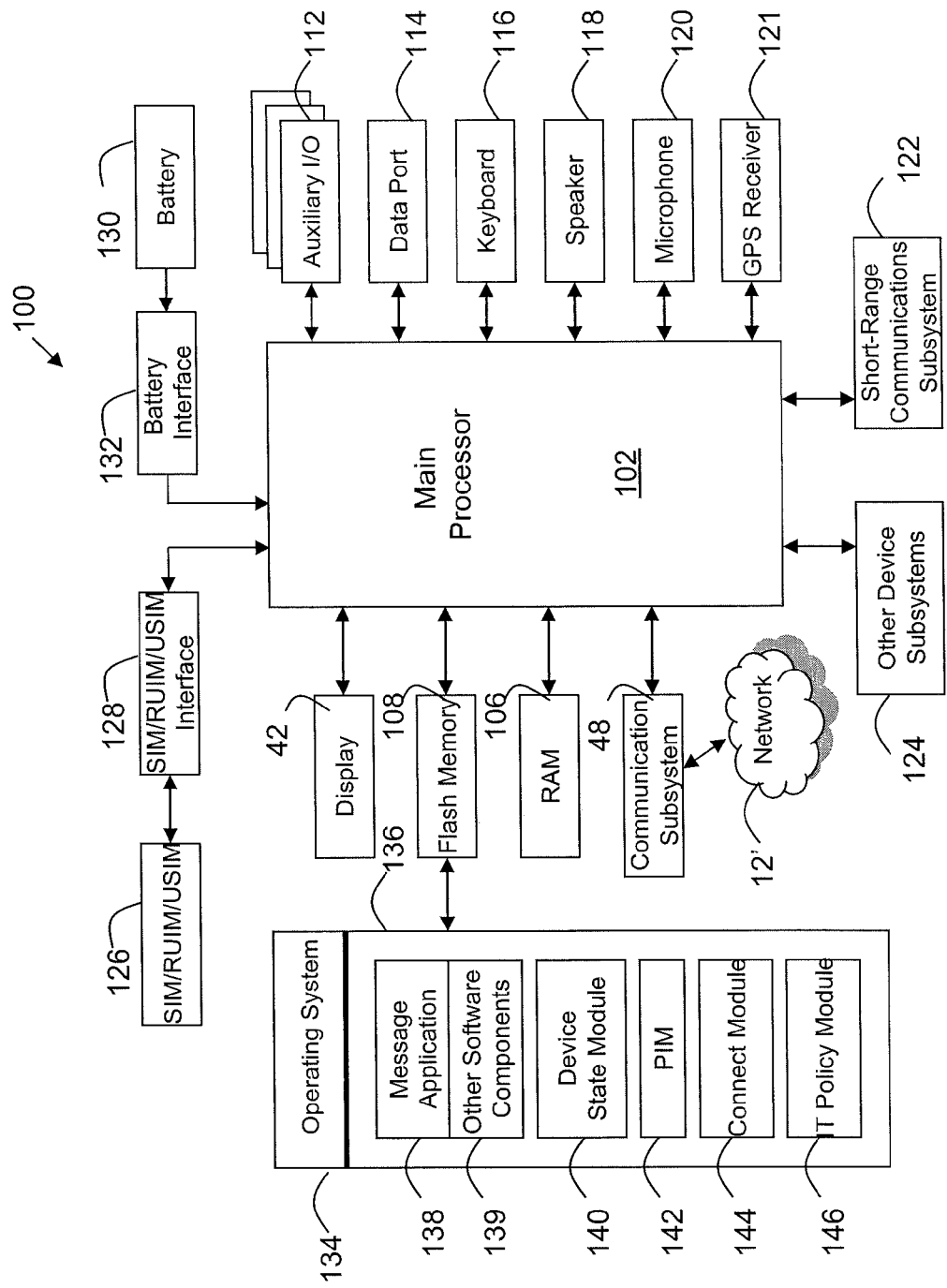
FIG. 18 is a block diagram of an example configuration for a mobile device.

Referring now to FIG. 18, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 48. The communication subsystem 48 receives messages from and sends messages to a wireless network 12'. In this example embodiment of the mobile device 10, the communication subsystem 48 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 48 with the wireless network 12' represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 42, an auxiliary input/output (I/O) subsystem 112, a data port 114, a keyboard 116, a speaker 118, a microphone 120, GPS receiver 121, short-range communications 122 and other device subsystems 124.

Some of the subsystems of the mobile device 10 perform communication-related functions, whereas other subsystems may provide "resident" or on-device functions. By way of example, the display 42 and the keyboard 116 may be used for both communication-related functions, such as entering a text message for transmission over the network 12, and device-resident functions such as a calculator or task list.

The mobile device 10 can send and receive communication signals over the wireless network 12' after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 12'. By inserting the SIM/RUIM/USIM 126 into the SIM/RUIM/USIM interface 128, a subscriber can access all subscribed services. Services may include: web browsing and messaging such as e-mail, voice mail, SMS, IM, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and includes a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, IM, contacts, calendar events, voice mails, appointments, and task items. A PIM application has the ability to send and receive data items via the wireless network 12'. PIM data items may be seamlessly integrated, synchronized, and updated via the wireless network 12' with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 108 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 12', the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 12'. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 48 and input to the main processor 102. The main processor 102 may then process the received signal for output to the display 42 or alternatively to the auxiliary I/O subsystem 112. A subscriber may also compose data items, such as e-mail messages, for example, using the keyboard 116 in conjunction with the display 42 and possibly the auxiliary I/O subsystem 112. The auxiliary I/O subsystem 112 may comprise devices such as: a touch screen, mouse, track ball, optical trackpad, infrared fingerprint detector, or a roller wheel with dynamic button pressing capability. The keyboard 116 is an alphanumeric keyboard and/or telephone-type keypad. However, other types of keyboards may also be used, such as a virtual or "soft" keyboard rendered as images on a touch screen. A composed item may be transmitted over the wireless network 12' through the communication subsystem 48.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 42 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the wireless infrastructure 52, etc., or accessible or connectable thereto. Any application or module herein described may be implemented using computer readable/executable instructions that may be stored or otherwise held by such computer readable media.

It will also be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A method of enabling a peer-to-peer connection, the method comprising:
a first endpoint sending to or receiving from a registrar in a first communication dialog, a request to exchange candidate lists with a second endpoint if sending the request, including a first candidate list and, if receiving the request, obtaining from the request, a second candidate list associated with the second endpoint, the first endpoint device being registered with the registrar, the first candidate list comprising one or more reflexive transport internet protocol addresses obtained by the first endpoint device;

the first endpoint device sending to or receiving from the registrar a candidate exchange response, if receiving the response, obtaining from the response, the second candidate list and, if sending the response, including the first candidate list in the response;

the first endpoint device ending the first communication dialog with the registrar;

the first endpoint device sending a connection request directly to the second endpoint using a first entry from the second candidate list;

if a connection response has not been received from the second endpoint, the first endpoint device sending another connection request to the second endpoint using the first entry or a next entry;

upon receiving a connection request from the second endpoint, the first endpoint device enabling the peer-to-peer session using an internet protocol address associated with the response; and the first endpoint device participating in a new communication dialog with the registrar for each subsequent peer-to-peer session with one or more of the second endpoint and another endpoint.

2. The method according to claim 1, the first endpoint device being registered using a session initiation protocol.

3. The method according to claim 2, wherein the request sent to or received from the registrar comprises a session initiation protocol MESSAGE.

4. The method according to claim 1, wherein the reflexive transport internet protocol addresses are obtained by communicating with a reflexive server using a session traversal utilities for network address translation request.

5. The method according to claim 1, wherein a plurality of connection requests are sent for each entry in the second candidate list.

6. The method according to claim 1, wherein the connection requests are sent using session traversal utilities for network address translation messages.

7. A computer readable storage medium comprising computer executable instructions for enabling a peer-to-peer connection, the computer executable instructions comprising instructions for:

a first endpoint sending to or receiving from a registrar in a first communication dialog, a request to exchange candidate lists with a second endpoint if sending the request, including a first candidate list and, if receiving the request, obtaining from the request, a second candidate list associated with the second endpoint, the first endpoint device being registered with the registrar, the first candidate list comprising one or more reflexive transport internet protocol addresses obtained by the first endpoint device;

the first endpoint device sending to or receiving from the registrar a candidate exchange response, if receiving the response, obtaining from the response, the second candidate list and, if sending the response, including the first candidate list in the response;

the first endpoint device ending the first communication dialog with the registrar;

the first endpoint device sending a connection request directly to the second endpoint using a first entry from the second candidate list;

if a connection response has not been received from the second endpoint, the first endpoint device sending another connection request to the second endpoint using the first entry or a next entry;

upon receiving a connection request from the second endpoint, the first endpoint device enabling the peer-to-peer session using an internet protocol address associated with the response; and the first endpoint device participating in a new communication dialog with the registrar for each subsequent peer-to-peer session with one or more of the second endpoint and another endpoint.

8. The computer readable storage medium according to claim 7, the first endpoint device being registered using a session initiation protocol.

9. The computer readable storage medium according to claim 8, wherein the request sent to or received from the registrar comprises a session initiation protocol MESSAGE.

10. The computer readable storage medium according to claim 7, wherein the reflexive transport protocol addresses are obtained by communicating with a reflexive server using a session traversal utilities for network address translation request.

11. The computer readable storage medium according to claim 7, wherein a plurality of connection requests are sent for each entry in the second candidate lists.

12. The computer readable storage medium according to claim 7, wherein the connection requests are sent using session traversal utilities for network address translation messages.

13. An electronic device comprising a processor and memory, the memory comprising computer executable instructions for enabling a peer-to-peer connection, the computer executable instructions comprising instructions for:

the electronic device sending to or receiving from a registrar in a first communication dialog, a request to exchange candidate lists with another endpoint, if sending the request, including a first candidate list and, if receiving the request, obtaining from the request, a second candidate list associated with the other endpoint, the electronic device being registered with the registrar, the first candidate list comprising one or more reflexive transport internet protocol addresses obtained by the electronic device the electronic device sending to or receiving from the registrar a candidate exchange response, if receiving the response, obtaining from the response, the second candidate list and, if sending the response, including the first candidate list in the response;

the electronic device ending the first communication dialog with the registrar;

the electronic device sending a connection request directly to the other endpoint using a first entry from the second candidate list;

if a connection response has not been received from the second endpoint, the electronic device sending another connection request to the other endpoint using the first entry or a next entry;

upon receiving a connection response from the other endpoint, the electronic device enabling a peer-to-peer session using an internet protocol address associated with the response; and the electronic device participating in a new communication dialog with the registrar for each subsequent peer-to-peer session with one or more of the other endpoint and a third endpoint.

14. The electronic device according to claim 13, the first endpoint device being registered using a session initiation protocol.

15. The electronic device according to claim 14, wherein the request sent to or received from the registrar comprises a session initiation protocol MESSAGE.

16. The electronic device according to claim 14, wherein the reflexive transport internet protocol addresses are obtained by communicating with a reflexive server using a session traversal utilities for network address translation request.

17. The electronic device according to claim 14, wherein a plurality of connection requests are sent for each entry in the second candidate list.

18. The electronic device according to claim 14, wherein the connection requests are sent using session traversal utilities for network address translation messages.

19. A method of enabling a peer-to-peer connection, the method comprising a registrar:
- sending to or receiving from a first endpoint device in a first communication dialog, a request to exchange candidate lists with a second endpoint, if receiving the request, obtaining a first candidate list from the request and, if sending the request, including in the request, a second candidate list associated with the second endpoint, the first endpoint device being registered with the registrar, the first candidate list comprising one or more reflexive transport internet protocol addresses obtained by the first endpoint device;
- sending to or receiving from the first endpoint device a candidate exchange response, if receiving the response, obtaining from the response, the first candidate list and, if sending the response, including the second candidate list in the response;
- ending the first communication dialog with the first endpoint device, the first endpoint device being subsequently capable of sending a connection request directly to the second endpoint using a first entry from the second candidate list, if a connection response has not been received from the second endpoint; sending another connection request to the second endpoint using the first entry or a next entry, upon receiving a connection response from the second endpoint; and enabling a peer-to-peer session using an internet protocol address associated with the response; and
- participating in a new communication dialog with the first endpoint device for each subsequent peer-to-peer session with the second endpoint and/or another endpoint.

20. A computer readable storage medium comprising computer executable instructions for enabling a peer-to-peer connection, the computer executable instructions comprising instructions for:
- sending to or receiving from a first endpoint device in a first communication dialog, a request to exchange candidate lists with a second endpoint, if receiving the request, obtaining a first candidate list from the request and, if sending the request, including in the request, a second candidate list associated with the second endpoint, the first endpoint device being registered with the registrar, the first candidate list comprising one or more reflexive transport internet protocol addresses obtained by the first endpoint device;
- sending to or receiving from the first endpoint device a candidate exchange response, if receiving the response, obtaining from the response, the first candidate list and, if sending the response, including the second candidate list in the response;
- ending the first communication dialog with the first endpoint device, the first endpoint device being subsequently capable of sending a connection request directly to the second endpoint using a first entry from the second candidate list, if a connection response has not been received from the second endpoint; sending another connection request to the second endpoint using the first entry or a next entry, upon receiving a connection response from the second endpoint; and enabling a peer-to-peer session using an internet protocol address associated with the response; and
- participating in a new communication dialog with the first endpoint device for each subsequent peer-to-peer session with the second endpoint and/or another endpoint.

21. An electronic device comprising a processor and memory, the memory comprising computer executable instructions for enabling a peer-to-peer connection, the computer executable instructions comprising instructions for:
- sending to or receiving from a first endpoint device in a first communication dialog, a request to exchange candidate lists with a second endpoint, if receiving the request, obtaining a first candidate list from the request and, if sending the request, including in the request, a second candidate list associated with the second endpoint, the first endpoint device being registered with the registrar, the first candidate list comprising one or more reflexive transport internet protocol addresses obtained by the first endpoint device;
- sending to or receiving from the first endpoint device a candidate exchange response, if receiving the response, obtaining from the response, the first candidate list and, if sending the response, including the second candidate list in the response;
- ending the first communication dialog with the first endpoint device, the first endpoint device being subsequently capable of sending a connection request directly to the second endpoint using a first entry from the second candidate list, if a connection response has not been received from the second endpoint; sending another connection request to the second endpoint using the first entry or a next entry, upon receiving a connection response from the second endpoint; and enabling a peer-to-peer session using an internet protocol address associated with the response; and
- participating in a new communication dialog with the first endpoint device for each subsequent peer-to-peer session with the second endpoint and/or another endpoint.

* * * * *